US007325715B2

United States Patent
Costello

(10) Patent No.: US 7,325,715 B2

(45) **Date of Patent: *Feb. 5, 2008**

(54) UNITARY VACUUM TUBE INCORPORATING HIGH VOLTAGE ISOLATION

(75) Inventor: Kenneth A. Costello, Alameda County, CA (US)

(73) Assignee: Interac, Inc., Santa Clara, CA (US)

(*) Notice: Subject to any disclaimer, the term of this patent is extended or adjusted under 35 U.S.C. 154(b) by 497 days.

This patent is subject to a terminal disclaimer.

(21) Appl. No.: 10/879,904

(22) Filed: Jun. 29, 2004

(65) Prior Publication Data

US 2004/0232834 A1 Nov. 25, 2004

Related U.S. Application Data

(62) Division of application No. 10/340,386, filed on Jan. 10, 2003, now Pat. No. 6,837,766, which is a division of application No. 09/652,516, filed on Aug. 31, 2000, now Pat. No. 6,507,147.

(51) Int. Cl.
*B23K 31/00* (2006.01)

(52) U.S. Cl. .................... 228/179.1; 228/221; 228/245

(58) Field of Classification Search ..................... None
See application file for complete search history.

(56) References Cited

U.S. PATENT DOCUMENTS 3,024,299 A * 3/1962 Nijhuis et al. .............. 174/538
3,509,430 A 4/1970 Mroz
4,044,374 A 8/1977 Roberts et al.
4,705,917 A 11/1987 Gates, Jr. et al.
5,120,473 A 6/1992 Kondo et al.

(Continued)

FOREIGN PATENT DOCUMENTS

DE 4314336 A1 11/1994
EP 1048939 A1 11/2000

OTHER PUBLICATIONS

Multilayer Ceramics Design Guide by Kyocera, CAT/2T9203THA/1242E, 1992.
Review of Scientific Instruments by C.C. Lim, vol. 57, pp. 108-114, no date avail.
High Voltage Performance Characteristics of Solid Insulators in Vacuum by HC Miller in High Voltage, no date avail.

(Continued)

*Primary Examiner*—Kiley Stoner
(74) *Attorney, Agent, or Firm*—Sughrue Mion, PLLC; Joseph Bach

(57) ABSTRACT

A housing for microelectronic devices requiring an internal vacuum for operation, e.g., an image detector, is formed by tape casting and incorporates leads between interior and exterior of said housing where said leads are disposed on a facing surface of green tape layers. Adjacent green tape layers having corresponding apertures therein are stacked on a first closure member to form a resulting cavity and increased electrical isolation or channel sub-structures are achievable by forming adjacent layers with aperture dimension which vary non-monotonically. After assembly of the device within the cavity, a second closure member is sealed against an open face of the package in a vacuum environment to produce a vacuum sealed device.

6 Claims, 5 Drawing Sheets

U.S. PATENT DOCUMENTS

| | | | | |
|---|---|---|---|---|
| 5,581,151 | A | 12/1996 | Wheeler et al. | |
| 5,611,876 | A | 3/1997 | Newton et al. | |
| 5,650,662 | A | 7/1997 | Edwards et al. | |
| 5,697,825 | A * | 12/1997 | Dynka et al. | 445/25 |
| 5,897,927 | A * | 4/1999 | Tsai et al. | 428/34 |
| 6,111,354 | A | 8/2000 | Fink et al. | |
| 6,285,018 | B1 | 9/2001 | Aebi et al. | |
| 6,573,640 | B1 | 6/2003 | Hakamata et al. | |

OTHER PUBLICATIONS

Insulation Edited by Rod Latham, Academic Press Copyright 1995, Chapter 8.

Design Guide by Coors Electronic Package Company, Copyright 1998.

* cited by examiner

UNITARY VACUUM TUBE INCORPORATING HIGH VOLTAGE ISOLATION

This is a division of Ser. No. 10/340,386 filed Jan. 10, 2003 now U.S. Pat. No. 6,837,766, which is a division of 09/652,516 filed Aug. 31, 2000, now U.S. Pat. No. 6,507, 147, issued on Jan. 14, 2003.

This invention was made with United States Government support under the cooperative agreement number 70NANB9H3015 awarded by the National Institute of Standards and Technology (NIST).

FIELD OF THE INVENTION

The invention relates to vacuum body housings for electron devices.

BACKGROUND OF THE INVENTION

Historically, electron devices in the first several decades of the 20$^{th}$ century required vacuum tight housings to support the propagation of an electron flux therein. These housings were hermetic structures of various materials and took on a variety of forms requiring a corresponding variety of equipment to fabricate. A very significant part of the cost of any such device was associated with the hermetic-sealed housing. During the last several decades of the century, solid state electron devices evolved for which there was no such vacuum requirement. There remain classes of electron devices which require formation and control of an electron flux in the vacuum environment for which the vacuum tight housing remains a major economic and operational consideration. Typical of these devices are x-ray sources, and image detection devices. Requirements for large scale production efficiencies and increased device complexities motivate an evolutionary approach to the design and fabrication of the package for micro-electronic devices. Generally desirable specifications for the housing would recognize the need to miniaturize the entire package; to assure an inherently low cost for materials and fabrication; to reduce the part count per device to obtain high yield in the manufacturing process; to employ conventionally available capital equipment; to obtain housings which can be characterized by a standard format; and in appropriate devices, to obtain a satisfactory isolation of any applied high potentials in the miniaturized device scale.

Consider the cooperative benefits of the above enumerated desiderata: a conventional standard form factor may be associated with existing classes of sockets and with existing equipment for surface mounting such devices on printed circuit boards. Unusually added complexities in the form of increased numbers of signal leads can be accommodated in such standard form factors, e.g., plastic leaded chip carrier (PLCC) type socketing hardware. In classic vacuum tubes 8, 12 and 16 leads inserted into the vacuum housing represented a significant level of complexity for the purposes of the device and for its fabrication. Contemporary PLCC sockets accommodate many leads. As many as 128 leads is a common requirement for modern integrated circuits. Such a number of signal and control leads is not unusual for an image detector array, by way of example.

Certain genera of fabrication processes practiced for producing packages for semiconductor devices are employed herein for the novel purpose of achieving vacuum tight housings for microelectronic devices. In the present work, reference will be repeatedly made to the example of a class of image detection devices employing electron bombarded active pixel arrays.

"Tape casting" is a well known form of fabrication of ceramic objects in the area of semiconductor packages. The term refers to a series of steps and resulting structures, wherein a ceramic slurry is created from selected ceramic precursors and additives for the particular purpose which are mixed on a flat work surface to produce a planar layer for an eventual multi-layered structure. A doctor blade or like instrument is then drawn over the slurry at a selected rate to obtain a uniform material thickness for that component layer. An aperture of specified dimensions is then removed from the interior of the constituent layer. The slurry is then allowed to dry in air and the result is known as a "green tape". Depending upon the additives, the green tape is flexible and sufficiently robust to tolerate reasonable handling. The tape is cut to size and a stack of green tape constituent layers is assembled to define a package for housing a semiconductor device. In the context of conventional semiconductor packaging, electrical leads may be printed with refractory metal-based inks deposited on surfaces of one or more component layers to provide electrical communication paths from the interior of the package to the exterior thereof. The stacked green tape assembly is then sintered at selected temperatures of the order of 1500° C. to produce a monolithic structure from the multi-layered composite into which the semiconductor chip is mounted, wire bonded to pads connected to the printed leads and the housing is then closed. Tape casting is a well known process for assembling ceramic packages for semiconductor devices. Typical references are "Multilayer Ceramics: Design Guidelines" (Kyocera, CAT/2T9203THA/1242E, 1992) and "Design Guide" (Coors Electronic Package Company, 1998).

In U.S. Pat. No. 5,581,151, a vacuum electronic image detector is known in which a cylindrical housing is formed from a layered ceramic structure, cofired to form a unitary ceramic structure. In this known structure, all control and signal leads (other than the photocathode) are lead through vias to pins downwardly projecting from the base of the housing. The plurality of layers forming this cylindrical known structure define an internal cylindrical cavity comprising a stepped arrangement of sequentially greater (lesser) diameter to support, or form component parts of the structure. Additionally, this prior art achieves a vacuum seal incorporating a flange brazed to the package body to adhere to an indium metal seal to a window, an arrangement that adds cost and processing complexity.

It is known in prior art to employ cold, crushed Indium for vacuum sealing. A representative reference is C. C. Lim, Review of Scientific Instruments, vol. 57, pp. 108-114 (1986).

SUMMARY OF THE INVENTION

The present invention exploits use of tape casting to produce vacuum tight composite structures particularly useful for vacuum electronic device housings. In particular, the housing is formed from a laminate of tape casting layers, and a cavity of desired volume is achieved by forming apertures in layers which are stacked upon a first end plate layer which latter directly or indirectly supports at least a portion of the electronic device. Electrode leads are formed on selected pre-fired layers to communicate laterally through the walls of the cavity. Electrical isolation is improved between selected regions of the cavity by varying the dimensions of substantially aligned apertures in non-monotonic fashion to produce an inwardly directed limiting aperture, or alternatively, an outwardly directed cavity extension, or channel. Improved electrical isolation is thus obtained by extending the linear distance on insulating surfaces between ground and high potential, without increasing the external dimensions of the housing. The laterally directed electrical leads also allow for a more axially compact device and permit a vacuum electronic device to conform to form factors commonly applied to semiconductor devices. Inwardly directed structures, separated by a layer of greater outward dimensions, produces a channel. In particular, the channel may be disposed close to a compressive seal and there arranged to capture the extruded flow of a vacuum sealant. The present invention achieves vacuum sealing through a cold, crushed soft metal seal directly between a planar metallized ceramic surface and a closure member.

In particular, the present invention more fully utilizes tape cast housings for vacuum microelectronic devices. A great virtue of the tape cast structure is the freedom of formation of the structural geometry. Another is the monolithic nature of the post-fired structure which permits deposit of refractory metal conductive films between component layers thereby achieving electrical communication through a vacuum enclosure without need for insertion of separate feedthrough terminals. Both of these features furnish subtle support for greater efficiencies in resulting vacuum electronic devices. For example, tape cast housings of the present invention are constructed to form internal cavities of generally rectangular cross section which match the generally rectangular form of typical components such as semiconductor circuits or circuit elements realized on semiconductor chips. In the present work, the specific example of an image detector employs an array of diodes sensitive to increments of the electron flux. Such arrays are commonly available in rectangular form. Matching the geometry of the component to the cavity permits a generally smaller cavity resulting in less wasted volume. The smaller internal cavity implies the lesser internal surface area, which is favorable for the ultra high vacuum (UHV) environment to be realized therein.

In like manner, forming conducting paths between the green tape layers provides for distributing signal leads over the lateral walls of the housing in contrast to the practice of bringing all leads through the base of the structure. Accordingly, the inventive housing may be constructed to accommodate well known standards for integrated device sockets (JEDEC type PLCC open frame mounts). A further advantage of laterally extending leads is that the resulting device can exhibit a more compact extension along its principal axis. In the exemplary image detector device described herein, typical applications such as night vision goggles can be formed for wear before the eyes with minimal inconvenience compared with comparable items of prior art.

Aside from the external advantages of a tape cast structure for microelectronic devices, there is an internal advantage in forming consecutive layers having aperture dimensions which do not vary monotonically among a series of layers. Simply, the resulting cavity may be formed to have intruding wall portions adjacent to less intruding wall portions. These serrations can be utilized to provide for added electrical isolation for relatively high voltage conductors without increasing the external size of the package. In like manner, a channel can be formed in the wall of the housing. Such channels are particularly useful adjacent to sealing medial where the compressed sealing media is allowed to flow into the channel for capture therein.

The vacuum microelectronic device is mounted within the tape cast housing and a closure member, including a sealing medium is installed and the seal effectuated in a vacuum environment at normal temperatures. Conventional vacuum preparation of the package includes a baking operation at about 300° C. to remove outgassing sources and an electron flux scrubbing to remove adsorbed residual gasses. For UHV microdevices a flat planar member is pressed against a flat metallized receiving surface of the ceramic housing using a soft metal (for example, In) interspersed therebetween and mechanical pressure is applied to the closure member to effect a cold weld between the closure member and the receiving surface. An adjacent channel proximate to the receiving surface receives the flow of the sealant. Providing an edge radius (or other window peripheral detail) to this flat planar member, proximate the ceramic surface where the soft metal extrudes, can improve the seal integrity.

In particular, an image detector is realized within this structure to great advantage. A proximity focused electron flux from a photocathode is intercepted by a CCD or like photodiode array. The image detector device is received in standard type socket hardware (such as a JDEC 68 lead PLCC) and consumes a thickness of about 6 millimeters.

Figure 1A:
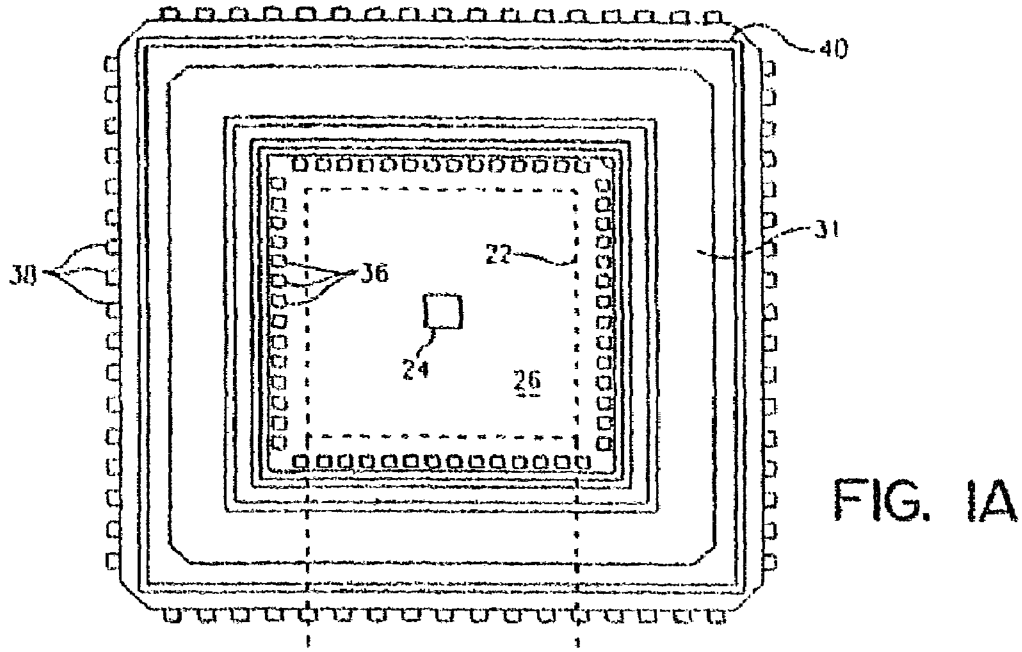
FIG. 1*a* is a top view of an image detector housing in accord with the invention.

While the invention is susceptible to various modifications and alternative forms, the above figures are presented by way of example and/or for assistance to understanding the structure or phenomena. It should be understood, however, that the description herein of the specific embodiments is not intended to limit the invention to the particular forms disclosed, but rather, the intention is to cover all modifications, equivalents, and alternatives falling within the spirit and scope of the invention as defined in the appended claims.

DETAILED DESCRIPTION OF THE INVENTION

The context of the present invention is best described in reference to a particular application which is here taken as an image sensing low light image detector which incorporates a photodiode array or like structure. These are, in turn, central elements of night vision cameras and similar apparatus. Apparatus of this type is disclosed in U.S. Ser. Nos. 09/356,799 and 09/356,800, now U.S. Pat. Nos. 6,307,586

B1 and 6,285,018 B1, respectively. The disclosures of these patents are incorporated for reference herein.

More particularly, the present invention more fully utilizes tape cast structures for vacuum microelectronic devices. One great virtue of tape cast structures is the freedom of formation of the structural geometry. Another is the monolithic nature of the post fired structure which permits prior formation of refractory metal films between component layers, which have been found to yield vacuum-tight signal leads through the walls of the housing. Both of these features furnish subtle support for greater efficiencies in resulting vacuum microelectronic devices. For example, tape cast housings of the present invention are constructed to form internal cavities of rectangular cross section which match generally rectangular components such as conventional semiconductor circuits and circuit elements. In the present work, the specific example of an image detector employs an array of photodiode sensors. Such arrays are typically arranged as a generally rectangular matrix. Matching that geometry, by orienting the package with the underlying device, permits a generally smaller resulting cavity with consequently less wasted volume. With the smaller internal cavity there follows, a smaller internal surface area, a favorable consideration for the ultra high vacuum (UHV) condition to be maintained therein. This orientational matching of the package with the internal device provides additional advantages. For the example of an image detector, a photocathode which is matched in orientation with the diode array allows for the minimum quantity of photocathode material. An unmatched relative orientation requires enough area for the photocathode to project on the active array with substantial unused photocathode area wasted, resulting in a costlier device. In this example of an image detector, there is a further desirable consequence to the conservation of that area, peripheral to the photocathode: a gettering material is supported in this region. By minimizing unnecessary photocathode material/area, the area devoted to a gettering surface is thereby capable of maximization with favorable result for maintenance of high vacuum.

Forming conducting paths between layers of the pre-fired structure provides for distributing leads over the lateral walls of the housing in contrast to the practice of bringing all leads through the base of the structure, as in prior art. Although laterally distributed electrical leads have been a commonplace standard for semiconductor devices, and especially facilitated by tape casting procedures, this construction has not been employed for vacuum housings. The procedure is contraindicated by vacuum desiderata. While co-firing of the green tape ceramic layers produces a monolithic result, this necessitates a significant compressive force on the stacked component layers to obtain a resulting structure of satisfactory mechanical integrity. The presence of refractory metal conductors between layers (leading from exterior to interior), would appear to locally shield adjacent facing surfaces, inhibiting the inter-molecular bonds between such adjacent surfaces. Nevertheless, with proper vacuum sealed closure to the housing, this structure has been found to provide a satisfactory UHV interior cavity. Thus, the housing of the present invention may be easily constructed to meet well known form factors for conventional integrated circuit devices, while passing unusual, or high voltage conductors through vias formed in the base or other isolated surfaces of the package. A further advantage of lateral extending leads is that the devices so housed exhibit a more compact extension along the principal axis (transverse to the laterally directed leads). In the exemplary image detector device discussed herein, a typical application, such as night vision goggles, can be formed for wear by the user with minimum inconvenience of many leads extending along the visual axis.

Figure 3:
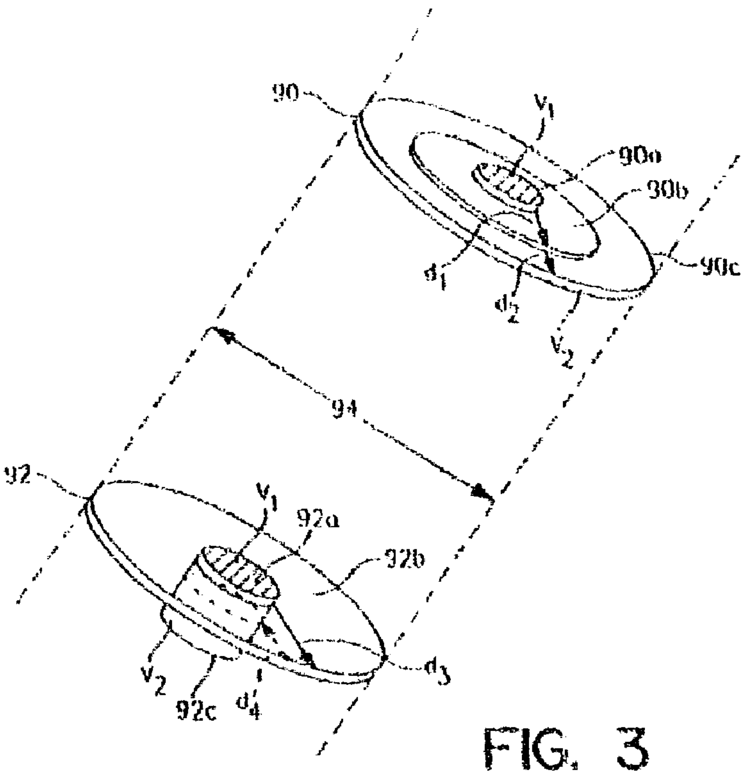
FIG. 3 is a fanciful comparison of high voltage isolation in exemplary prior art and inventive structures having identical external dimension.

Aside from the external advantages of a tape cast structure for vacuum microelectronic devices, there is an internal structural advantage in forming consecutive layers with corresponding apertures which do not exhibit a monotonic change in aperture dimensions. In the prior art, consecutive layers of a layered structure formed a simple stepped arrangement of consecutively increasing (decreasing) dimension. The resulting prior art structure requires a greater external dimension for the same realized internal electrical isolation. This is illustrated in FIG. 3 where a fanciful comparison is shown for a stepped structure 90, exemplary of prior art, and a structure 92, following the present invention. For a common external dimension 94 the surface distance between a central member 90*a* at one assumed potential $V_1$ and an outer surface 90*c* at another potential $V_2$, includes $d_1$ and $d_2$. The comparable inventive structure 92 has central member 92*a* intermediate, inwardly protruding structure 92*b* and an outer surface defined by member 92*c*. It is apparent that the combined surface distances $d_3$ and $d_4$ exceed the corresponding distances $d_1$ and $d_2$ significantly. For components 90*a* and 92*a* of the same dimensions (the same chip), $d_3+d_4 \cong 2(d_1+d_2)$.

The present invention is also capable of achieving a resulting cavity formed to include intruding wall portions adjacent to less intruding wall portions. These (cross sectional) serrations can be utilized to provide added geometrical isolation for high voltage terminals.

Figure 2A:
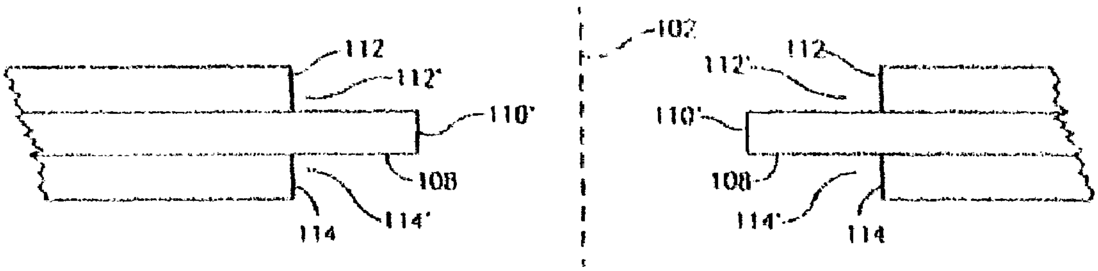
FIG. 2*a* describes an exploded view of an inwardly protruding shelf portion of a housing.

Turning now to FIG. 2*a*, inwardly protruding (intruding) ceramic shelf 108 is formed from an aperture 110' surrounded by apertured ceramic portions 112 and 114 for which latter apertures 112' and 114' comprise a greater area than for aperture 110'. The area difference defines intruding shelf 108. This intruding shelf lengthens any distance along the surface of the ceramic cavity portion between high voltage terminals and ground located at opposite directions along the axis 102. In contrast, it is known to achieve electrical isolation through the series of stepped or terraced surfaces 90*a*, 90*b* and 90*c* fancifully illustrated in FIG. 3. However, in this known approach, the stepped surfaces occupy a greater projected area on the base plane of the device. In the context of the tape cast construction described here, the known manner of isolation results in green tape layers having apertures therein which vary monotonically (in area, or selected linear dimension), whereas the apertures defining the cavity may vary in a non-monotonic manner to define the shelf structure.

Figure 2B:
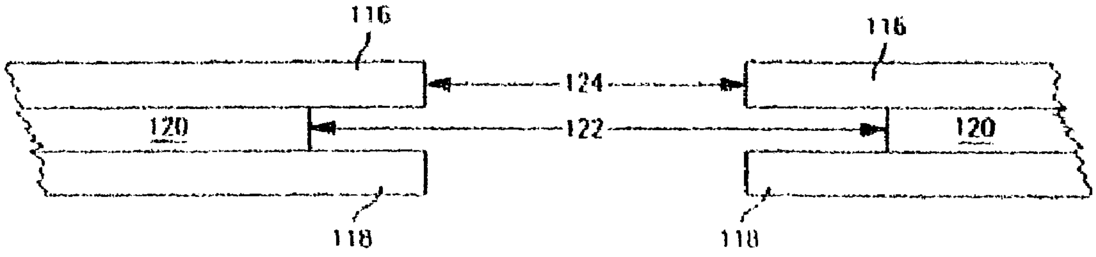
FIG. 2*b* describes an exploded view of a portion of a housing featuring a peripheral channel.

FIG. 2*b* shows the complementary arrangement wherein a channel is formed between green tape layers 116 and 118 by interposition therebetween of layer 120 having an aperture 122 which is greater than the aperture 124 characteristic of adjacent layers 116 and 118. Such channels are of use for a variety of purposes; in particular, such a channel, adjacent to a sealing surface such as surface 32 on which a deformable sealing substance is disposed, provides a volume to capture the extruded sealing substance, as further described below.

Figure 1B:
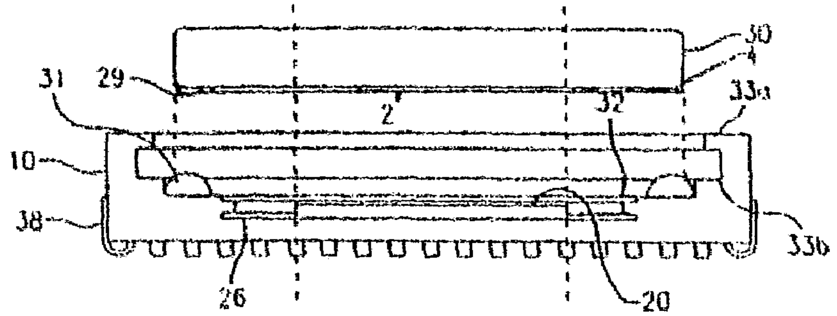
FIG. 1*b* is a side cutaway view of an image detector housing in accord with the invention.
Figure 1C:
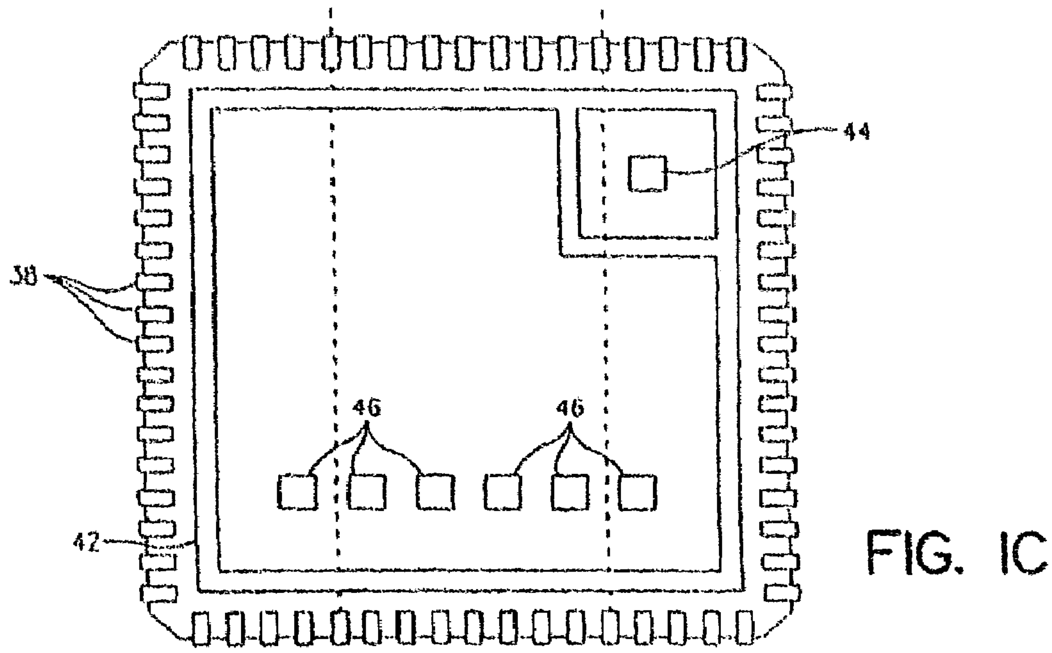
FIG. 1*c* is a bottom view of an image detector housing in accord with the invention.

A plan view, cutaway/side view and bottom view of an example of the present housing are presented in FIGS. 1*a*, 1*b* and 1*c*, respectively for a proximity focused active electron image detector. This example is designed for supporting the low light image sensing detector of the type described in the disclosures referenced above and incorporated by reference herein. A CCD array 20, or like device occupies the area enclosed by dotted lines 22. The CCD array 20 is secured mechanically to bonding pad 24 on the interior base surface 26 of the package. The array 20 is maintained at anode potential, e.g., ground, in proximity focus with a photocathode (not shown) bonded to the central portion of lower/interior surface 29 of transparent closure member 30. When assembled, the closure member 30 is bonded to surface 32 through the agency of a soft metal 31 crush seal as described herein below. Internal bonding pads 36 (representative ones labeled) communicate with external terminals 38 through refractory metal traces embedded within the ceramic structure 10 as described herein. In conventional practice, there need be no one-to-one correspondence between pads 36 and terminals 38 because one or more terminals 38 may be employed to connect to grounded regions (such as guard rings 40 and/or 42, or may provide multiple access to the same internal pad, or may be left with no connection to provide for future variations of the apparatus. Conventional wire bonding is affected between CCD array 20 and selected internal pads 36 to deliver CCD outputs and supply necessary biases and controls for the operation of the CCD array 20 in known manner.

High voltage pad 44 in the interior of the package base communicates through a conventional via to an external terminal. From this pad 44, a metallized conductor is formed through the body of the ceramic package 10 to connect to the photocathode through the In seal 31. The enclosure of the high voltage conductor by the ceramic body of the package thus negates the need for an external case to surround the package (as is the need in prior art) for protection against possible pernicious effects owing to an external high voltage conductor. Additional paths through pads 46 are similarly provided through the base. Together with high voltage pad 44, these pads furnish direct communication with a power supply module and/or display module through appropriate mating connectors or ball bonds to establish, for example, a feedback loop to enable various control and stabilization functions. An example for such control and stabilization is the control of the duty cycle of the high voltage power supply from an average video signal level. See U.S. Ser. No. 09/356,799, referenced above. The details of such arrangement are outside the scope of the present work.

The several laterally directed electrical leads emerging at terminals 38 are formed using classic tape casting techniques as practiced for the packaging of semiconductor chips. It is determined in the present work that this processing, together with the sealing steps and structure of the present invention results in a housing which sustains the desired UHV environment for vacuum electronic devices. This result is surprising because the steps of preparing a green tape layer for bearing an electrical lead from the inside to the outside of the eventual cavity in a side lead configuration would be expected to produce a possible leakage path to atmosphere. With lead counts on the order of $10^2$, the reliability of vacuum seals must be much better than 99% to achieve an acceptable manufacturing yield. Moreover, leak rates must be better than about $10^{-15}$ Torr Liter/sec to achieve a shelf life of 5 years. Such a leak rate is far below the sensitivity of available leak detection instruments by a factor of about $10^6$.

Briefly, a green tape layer bearing the connection is prepared by "screen printing" conductor lines and pads on its facing surface, using a tungsten-based paste. The green layers are then stacked together and subjected to substantial compressive forces and sintered at elevated temperatures (of the order of 1500° C.) Compression is required to obtain the necessary intimate relationship for the adjacent ceramic surfaces. However, one observes that this relationship is shielded by an interposed refractory metal conductor trace leading directly between the ambient and the vacuum regions. Moreover, this conducting trace most commonly comprises the refractory metal in the form of particulates. It has been found that a housing, so constructed, and comprising a closure member and seal according to the present work, will yield a sustainable UHV environment in the housing.

An image detector, constructed with the advantages of the present invention, is assembled by orienting the imaging array 20 with the geometry of the package. Inasmuch as the package is fabricated with the geometry of the chip given, the resulting economies of space are evident from the footprint 22 of the chip to be installed in the package as shown in FIG. 1*a*. The chip 20 is mechanically secured to pad 24 and conventional wire bonding apparatus is employed to connect corresponding terminals of the chip to respective internal bonding pads 36. In the proximity focusing imaging detector of the present example, care must be taken to insure a minimal height to the wire bonds to avoid distortion of the proximity focusing field. External terminals 38 are affixed in conventional fashion. The high voltage conductor is directed through pre-positioned vias in the ceramic layers to contact the photocathode. Thus, the high voltage conductor is effectively shielded from other components by several millimeters of ceramic. In preparation for sealing, the closure member 30 is separately prepared by well known practice of bonding a specified photocathode (preferably GaAs or a multi-alkali) onto a portion of the surface 29 of the glass closure member, the portion having a normal projection on the CCD array 20. A getter material 4 (preferably Ti, Hf, Zr, V, Fe or their alloys) is deposited on the peripheral region of this surface. The available area for the getter deposition is clearly maximized by the careful minimization of the photocathode area 2 to that portion of the surface 29 which directly overlays the active portion of the CCD chip 20. This is achievable through the orientation of the geometry of the package to that of the chip, and the mutual orientation of the photocathode 2 with respect to the closure member and the chip. The getter material 4 may be disposed to overlap both the photocathode periphery and the edges of the In metal seal 31, thus insuring electrical conductivity and uniform parallel electric field within the device.

Figure 4:
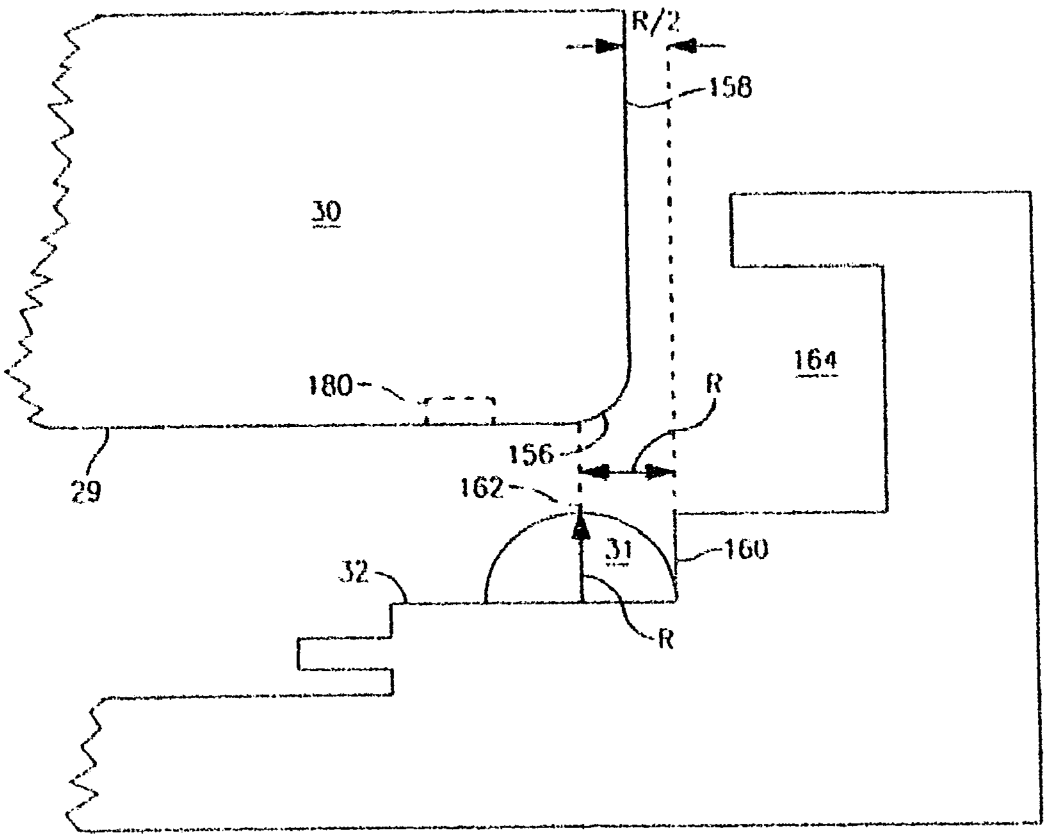
FIG. 4 illustrates salient aspects of the soft metal UHV seal prior to sealing.
Figure 5:
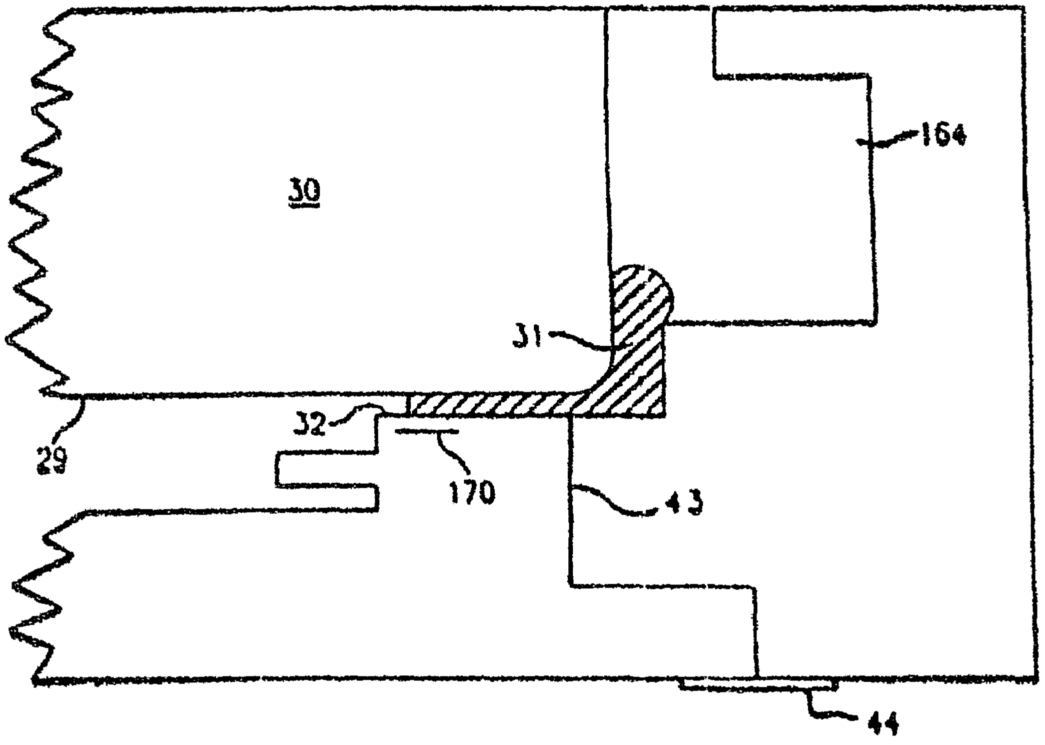
FIG. 5 shows the package portion of FIG. 4 after achieving the seal.

The closure member and seal for an image detector of the prior art was achieved for soft metal (indium) seals by brazing an annular cup to the ceramic body of the device. The transparent closure plate was characterized by a diameter slightly less than the outer wall of the cup. The prior art cup was intended for containing melted indium and was formed asymmetrically with an outer wall extending along the thickness of the closure member whereas the inner wall was limited by the planar surface of the closure member. Upon melting, the In wet the surface of the cup and provided for further sealing surface along the vertical dimension (thickness) of the closure member as well as the peripheral region of the planar surface. This approach required a separate component, the annular cup, and the brazing of the cup to the ceramic body. The present invention employs no annular cup and dispenses with the step of brazing a separate annular sealing containment member to the unitary ceramic body. In the present invention, the planar surface to be overlaid by the seal is metallized in conventional fashion and the necessary chips/components are installed bonded in the open housing by conventional techniques. The metallization is conventionally implemented with titanium-tungsten and nickel-gold deposition. This metallization is known to exhibit strong affinity for the preferred indium metal sealing gasket. The now assembled (but open package) resides in a chamber at UHV pressure (about $10^{-10}$ Torr) with the indium material directly on the sealing surface which in turn is adjacent to a channel 164 formed in the package between lip 33*a* and surface 33*b*. The closure member 30 is aligned with the receiving recess defined by lateral edge surface(s) 160 of the housing and the closure member 30 is then urged against the housing with force sufficient to achieve the seal (without melting the sealing medium) allowing the extruded sealing medium (In) to flow past the shaping step 160 into the channel 164. In the present invention, the In seal 31 is directly wetted to metallized planar surface 32 and constrained at its outer periphery by the surface 160 of the housing recess. The artful relationship of dimensions characterizing the champfered edge 156 of the closure member 30, the clearance of the outer periphery 158 of the closure member 30 against the edge 160 and the maximum thickness R of the In gasket 31 are illustrated in FIG. 4 prior to the sealing operation. The indium sealing material is in the form of a closed ring 31 conforming to the planar geometry of the ceramic surface 32. The In material exhibits a maximum thickness R determined by its surface tension in a fluid state attained when formed and then cooled. The closure member 30 has a chamfered edge 156 characterized by a radius of curvature of about R/2. The clearance of the lateral edge 158 of closure member 30 with the projection of the outer limiting surface 160 is about R/2. In practice a value for this clearance is about 0.020 inch. The alignment of the maximum thickness location of the indium with the extreme planar edge 158 of the closure member produces a desirable flow of the In when a pressure of 1000 to 8000 psi is applied over the area of the crushed seal 31. Under these approximate conditions the outward directed cold flow of the indium is sufficient to seal against surface 160 and to flow into channel region 164, while the inner directed flow is limited to the surface 32. That is, the force directed between the closure member and the package housing is adjusted to assure that the inwardly directed flow does not enter the aperture. The seal, in its crushed state is shown in FIG. 5. After sealing, the force on closure member 30 is relaxed. The inwardly directed extrusion provides a buffer between the ceramic surface 32 and the lower surface 29 of the glass closure member 30, eliminating stress concentration regions which could result in cracking of the closure member 30. The inward flow also increases the local surface area over which pressure is applied, thereby enhancing the self-leveling tendency when force is uniformly applied to achieve the seal. In the particular application of the proximity focused image detector it is critical for the photocathode disposed on surface 29 to be parallel with the photodiode array 20. The latter is independently mounted in closely parallel relationship with the planes defined by the laminated structure and hence with the metallized planar surface 32. Alternatively, hard stops could be provided to locate the lower surface 29, but this would increase the risk of cracking the glass closure member 30.

A simple radius on the lower peripheral surface of the window is shown in the figures. The curvature is believed to improve the sealing performance of the extruded indium by providing surfaces for seal retention by forces other than the adherence bond between the indium and the closure member 30. An alternative window detail consists of providing a peripheral recess in the lower surface of the window (closure member 30) as indicated by dotted line 180 in FIG. 4. This provides a similar cavity into which inwardly extruding indium is captured and furnishes surfaces non-parallel with surface 32 for seal retention.

FIG. 5 also illustrates an embodiment easily achieved in packages constructed through the general technique of tape casting wherein one or more guard rings or field shaping electrodes may be disposed within the unitary ceramic package. This feature follows from the tape cast methodology wherein one or more selected laminae receive a refractory metal print of the desired guard ring/field shaping conducting surface. A conducting path is provided to the exterior of the package by the above described techniques, e.g., as by connection to a selected one of terminals 38. For the specific example of the image detector, electrode 170 is shown in FIG. 5 disposed in close proximity to the triple junction of vacuum, ceramic surface 32 and the periphery of the high voltage photocathode surface 29 and In seal 31. The technical practices for dealing with high voltage insulation and protection in such environments are discussed by H. C. Miller in "High Voltage Vacuum Insulation", R. Latham, ed., pp. 299-328, Academic Press (1995). The field between the photocathode and the anode can be limited in this neighborhood by application of suitable potential to the electrode 170 relative to the anode. For example, if this electrode 170 is tied to the same potential as the photocathode, the electric field at the vacuum-metal-ceramic triple junction will be substantially reduced.

Figure 6A:
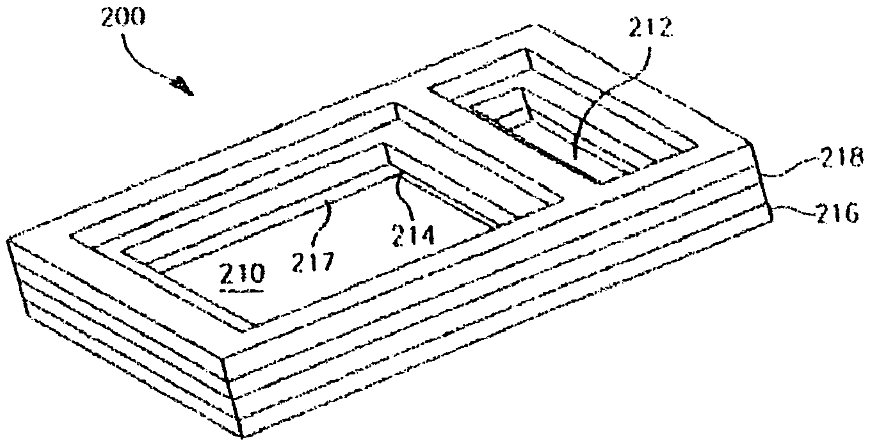
FIG. 6*a* shows an embodiment of the inventive package featuring multiple cavities.
Figure 6B:
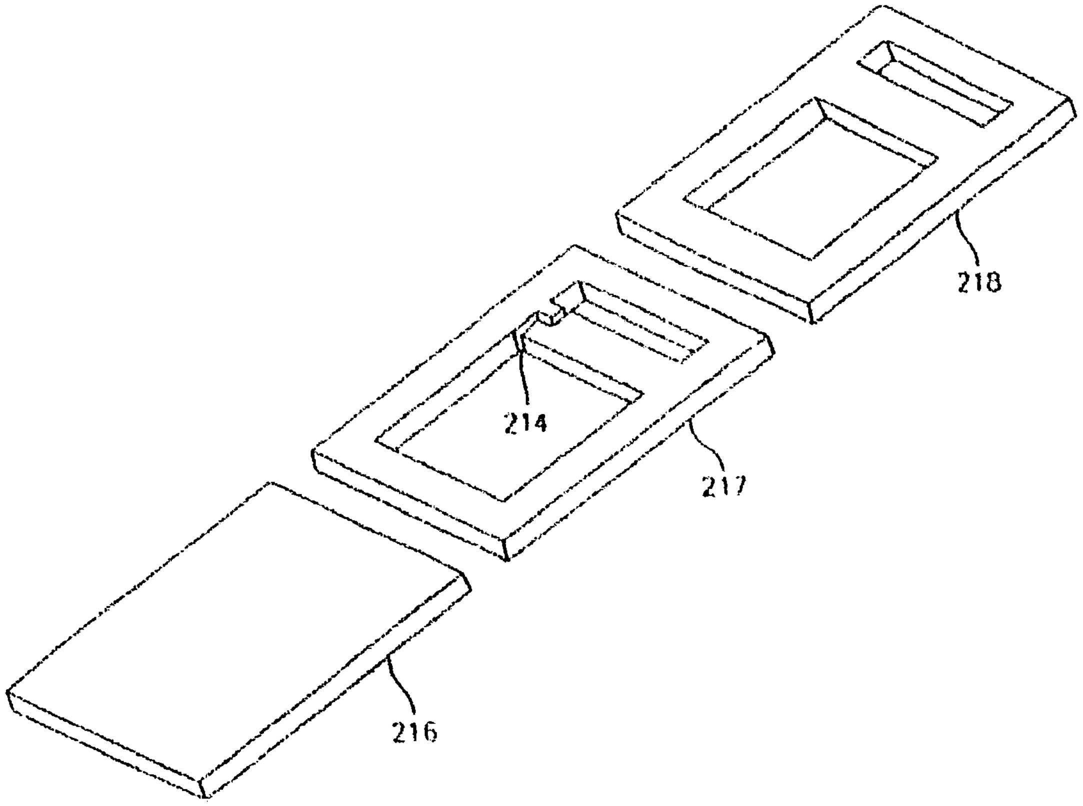
FIG. 6*b* shows three lamina of the package of FIG. 6*a*.

In another embodiment, further possibilities for novel tape cast packaging structures are exemplified in the package of FIGS. 6*a* and 6*b*. Multiple cavities 210, 212 are achieved within the same package body 200 (closure member not shown). In general the multiple cavities may be independent for appropriate purposes, or as shown, a conduit 214 is realized by a suitable shaped aperture in one or more laminae 217. Here, the main cavity 210 serves to support an image detector as described above. The chamber 212 is provided to enclose further gettering surfaces (not shown). The conduit 214 is preferred to exhibit a baffled, or serpentine shape to better isolate evaporated getter from affecting the high voltage properties of the image detector portion of the package.

The present invention is shown to exhibit substantial economies by extension of tape casting to produce UHV enclosures for microelectronic devices capable of conformance with standard form factors and socketing hardware, conservative of photocathode material in the case of photosensitive devices, with capability for improved interior electrical isolation of high voltage conductors.

Although this invention has been described with reference to particular embodiments and examples, other modifications and variations will occur to those skilled in the art in view of the above teachings. It should be understood that, within the scope of the appended claims, this invention may be practiced otherwise than as specifically described.

What is claimed is:

1. The method of creating a unitary vacuum microelectronic imaging device comprising:

laminating a structure comprising first and second planar end plates and a plurality of insulating intermediate planar plates disposed therebetween, one of said end plates comprising a transparent wall with a photocathode on a surface, forming a cavity in said laminated structure by positioning at least three of said intermediate plates against each other, each of said intermediate plates being selected as to have an aperture therein as to form a cavity in said laminated structure when said plates are positioned against each other, said at least three plates having apertures that vary non-monotonically when positioned in series with one another, positioning and bonding said transparent end plate onto an intermediate plate by flowing an indium seal between said end plate and said intermediate plate with said photocathode surface on said end plate facing said cavity, positioning and bonding a microelectronic device at the other said end plate opposite to said end plate with a transparent wall, and creating a vacuum pocket within said cavity, said indium seal being pressed into said bonding relationship sealing said vacuum device while the assembly of said device is maintained in an ultra high vacuum environment.

2. The method of creating a unitary vacuum microelectronic imaging device in accordance with claim 1 in which the surface of said intermediate plate is first metallized with a titanium-tungsten and nickel gold deposition prior to flowing said indium seal between said end plate and said intermediate plate.

3. A method in accordance with claim 1 in which said transparent end plate is urged against said indium seal with a pressure in the range of between 1000 to 8000 psi.

4. A method in accordance with claim 1 in which a seal is obtained by pressing said transparent end plate against said indium seal while said device is maintained in a vacuum chamber.

5. A method in accordance with claim 4 in which said vacuum chamber is maintained under ultra high vacuum conditions.

6. A method in accordance with claim 4 in which said vacuum chamber is maintained at a vacuum of about $10^{-10}$ Torr.

* * * * *